No. 678,489.  
T. J. HUBBELL.  
CULTIVATOR.  
(Application filed Apr. 17, 1901.)  
Patented July 16, 1901.
(No Model.)
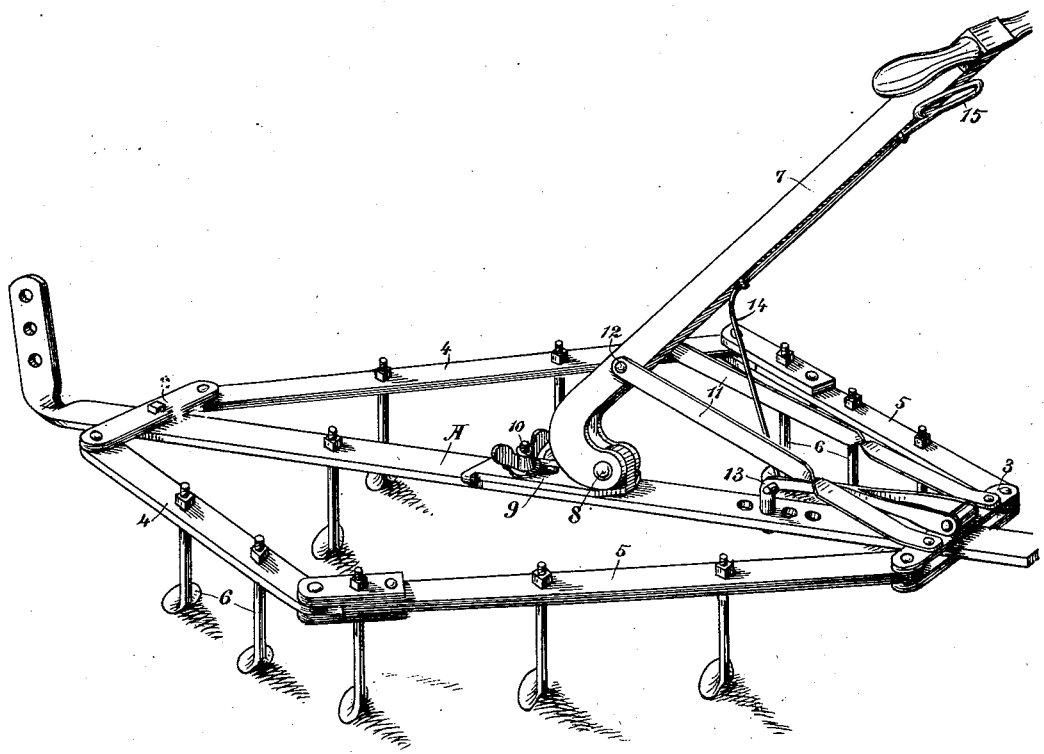

UNITED STATES PATENT OFFICE.

THOMAS J. HUBBELL, OF WATSONVILLE, CALIFORNIA, ASSIGNOR TO DRUSILLA HUBBELL AND WILLIAM H. AMES, OF SAME PLACE.

CULTIVATOR.

SPECIFICATION forming part of Letters Patent No. 678,489, dated July 16, 1901.

Application filed April 17, 1901. Serial No. 56,187. (No model.)

*To all whom it may concern:*

Be it known that I, THOMAS J. HUBBELL, a citizen of the United States, residing at Watsonville, county of Santa Cruz, State of California, have invented an Improvement in Cultivators; and I hereby declare the following to be a full, clear, and exact description of the same.

My invention relates to improvements in apparatus for cultivating the land.

It consists of an adjustable tooth-carrying frame, with means by which it may be expanded or contracted to adjust the apparatus for different widths of rows through which it is to travel.

My invention also comprises details of construction, which will be more fully explained by reference to the accompanying drawing, in which the figure shows the cultivator ready for use.

A is the main longitudinal beam of my apparatus, having fixed across the front a short transverse bar 2.

3 is a similar bar slidable upon the rear end of the main beam A.

4 4 are bars having their front ends pivoted to the cross-bar 2, and 5 represents similar bars having their rear ends pivoted to the slidable cross-bar 3.

The meeting ends of the bars 4 and 5 are pivoted together, so that when the transverse bar 3 is caused to slide upon the beam A by moving it rearwardly the meeting angles of 4 and 5 are drawn more nearly together, and by moving it forward these angles are correspondingly separated and the width of the cultivator increased. These bars 4 and 5 carry the cultivator-teeth 6, which may be made of any suitable or desired form and interchangeable, if desired. Similar teeth may also be carried upon the central main beam A. It will thus be seen that for the purpose of cultivating between narrow rows, as of beets, the width of the apparatus can be contracted to suit the width of the rows, and if the rows are wide, as between the vines in vineyards, the width of the cultivator may be correspondingly expanded. In order to operate these devices, I have shown a handle 7, pivoted, as at 8, to a clamp 9, which is fixed to the main beam A by a bolt and lock-nut, as at 10, or some equivalent fastening.

11 represents links, the forward ends of which are pivoted to the lever 7, as shown at 12, and the rear ends are connected with the slidable bar 3, so that by pushing the lever 7 forward, while its lower end is connected with the fixed clamp 9, the slide 3 will be drawn with it, thus expanding the tooth-bars 4 and 5, and by moving the lever 7 backwardly the space between the tooth-bars will be correspondingly made narrower.

In order to hold the slide and the tooth-bars at any desired point of adjustment, I have shown a hook-lever 13, the rear end of which is hinged to the slide-bar 3. The front end carries a point or pin which is adapted to enter any one of a series of holes made in the beam A, and thus lock it in position. When it is desired to adjust the cultivator-frame, this hook is raised and disengaged from the holes by means of a rod 14, the lower end of which connects with the hook-bar 13 and the upper end being slidable in guides beneath. The lever 7 has a suitable handle, as 15, by which it can be moved. When any adjustment of the cultivator has thus been made, if the angle of the lever-handle 7 is not suitable for the convenience of the operator it can be adjusted by disengaging the front of the clamp 9 and moving it either forward or backward upon the beam A until the lever-handle 7 stands at the desired angle when the other parts have been properly adjusted. By these adjustments I am enabled to provide a cultivator which is convenient for a great many different kinds of work.

Having thus described my invention, what I claim as new, and desire to secure by Letters Patent, is—

1. The combination in a cultivator of a central longitudinal beam, tooth-bars having their meeting ends pivoted together, and their front and rear ends connected with the main beam, means by which one of said connected ends may be moved upon the main beam to expand or contract the width of the cultivator, and means for locking the parts when adjusted.

2. The combination in a cultivator of a main draft-beam a fixed transverse bar at the front, and a bar slidable at the rear, tooth-bars having their meeting ends pivoted together, the front bars pivoted to the fixed transverse bar and the rear bars to the slidable rear bar, means by which the slidable bar is moved to increase or diminish the transverse spread of the tooth-bars.

3. The combination in a cultivator of a main draft-beam a fixed transverse bar at the front, a slidable transverse bar at the rear, tooth-bars having their meeting angles pivoted together, the front bars pivoted to the front of the draft-bar and the rear bars to the slidable transverse bar, a lever-handle fulcrumed upon the draft-bar, links connecting said lever with the rear slide whereby the latter may be moved forward or back to expand or contract the spread of the tooth-bars.

4. The combination in a cultivator of a main beam, tooth-bars having their front ends pivoted thereto and their rear ends pivoted to similar tooth-bars, a slide movable upon the beam with which the rear ends of the second pair of tooth-bars are connected, a lever adjustably fulcrumed to the beam, links connecting the lever with the sliding bar and a locking-hook hinged to said bar adapted to engage holes in the beam.

5. The combination in a cultivator of a main beam, tooth-bars pivoted to and diverging from the front end of the beam, other tooth-bars pivoted to the first pair having their rear ends pivoted to a slide movable upon the main beam, a lever adjustably fulcrumed upon the main beam, links connecting said lever with the slide, a latch by which the slide is locked to the main beam at any desired adjustment, a rod connected therewith and slidable upon the handle whereby the latch may be released and the position of the tooth-bars changed.

In witness whereof I have hereunto set my hand.

THOMAS J. HUBBELL.

Witnesses:
 GEO. H. STRONG,
 S. H. NOURSE.